US012534305B2

(12) United States Patent
Lan et al.

(10) Patent No.: US 12,534,305 B2
(45) Date of Patent: Jan. 27, 2026

(54) PLC COAL MACHINE CONTROL SYSTEM

(71) Applicant: Shantou Power Plant of Huaneng (Guangdong) Energy Development Co., Ltd, Guangdong (CN)

(72) Inventors: Jian Lan, Guangdong (CN); Weiqing Li, Guangdong (CN); Ziyang Guo, Guangdong (CN); Chuanwei Zhang, Guangdong (CN); Lijie Zhang, Guangdong (CN); Rong Xiao, Guangdong (CN); Qiaoxia Cai, Guangdong (CN); Yihan Zhang, Guangdong (CN); Yichong Chen, Guangdong (CN)

(73) Assignee: Shantou Power Plant of Huaneng (Guangdong) Energy Development Co., Ltd, Shantou (CN)

( * ) Notice: Subject to any disclaimer, the term of this patent is extended or adjusted under 35 U.S.C. 154(b) by 379 days.

(21) Appl. No.: 18/317,938

(22) Filed: May 16, 2023

(65) Prior Publication Data
US 2024/0174450 A1 May 30, 2024

(51) Int. Cl.
*B65G 43/02* (2006.01)
*B65G 43/08* (2006.01)
*G01G 13/24* (2006.01)
*G05D 7/06* (2006.01)

(52) U.S. Cl.
CPC ............ *B65G 43/02* (2013.01); *B65G 43/08* (2013.01); *G01G 13/248* (2013.01); *G05D 7/0605* (2013.01)

(58) Field of Classification Search
CPC .... B65G 43/02; B65G 43/08; B65G 2201/04; G01G 13/248; G01G 11/083; G05D 17/0605; G05B 19/054; G05B 2219/1103
USPC .......................................................... 177/45
See application file for complete search history.

(56) References Cited

U.S. PATENT DOCUMENTS 8,662,290 B2 * 3/2014 Twigger ................. B65G 43/02
198/810.01
11,060,032 B2 * 7/2021 Quanci ................... C10B 15/02

FOREIGN PATENT DOCUMENTS

| CN | 201392233 | * | 1/2010 | ............ Y02P 90/02 |
| CN | 206068970 | * | 4/2017 | |
| CN | 208579823 | * | 3/2019 | |
| CN | 208579823 U | * | 3/2019 | |
| CN | 2020010771127 | * | 8/2020 | ............ F23N 1/005 |

* cited by examiner

*Primary Examiner* — Jacques M Saint Surin

(57) ABSTRACT

The present disclosure relates to the technical field of coal-fired power plant equipment, in particular to a PLC coal machine control system, including a PLC control unit, a weighing unit one, a weighing unit two, a drive unit, a frequency converter, a belt motor and a velocity measuring unit; wherein the PLC control unit is electrically connected to the weighing units one and two, for making a real-time collection of weight values of the two units; and the PLC control unit is electrically connected to the drive unit, frequency converter and velocity measuring unit, for making a real-time collection of output signals of the drive unit, velocities of the frequency converter and velocities detected by the velocity measuring unit. According to the present disclosure, the PLC controller is employed to process signals, so that the stability of the system is improved and stable operation of a generator set is guaranteed.

7 Claims, 1 Drawing Sheet

PLC COAL MACHINE CONTROL SYSTEM

TECHNICAL FIELD

Figure 1:
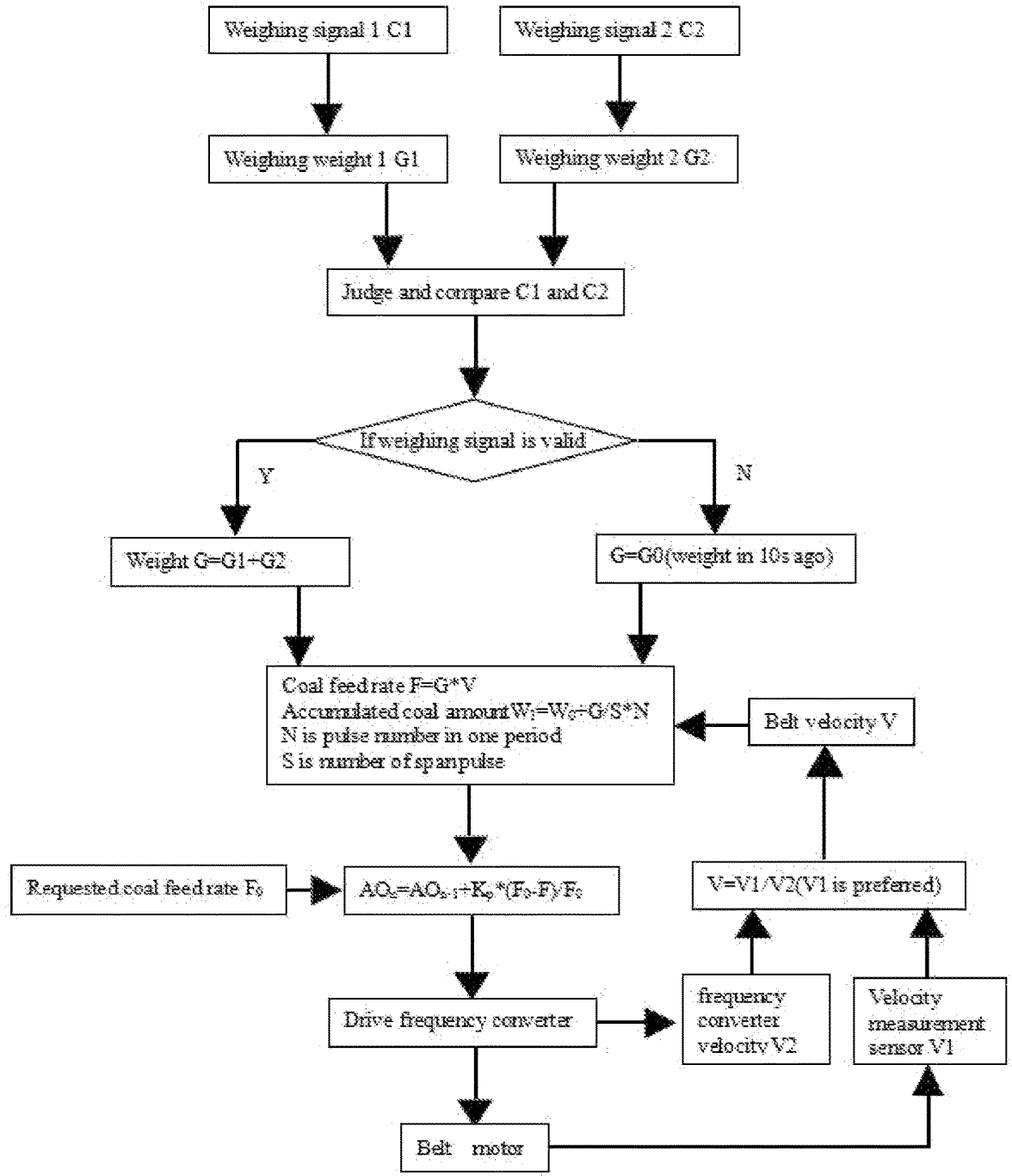

The present disclosure relates to the technical field of coal-fired power plants, in particular to a PLC coal machine control system.

BACKGROUND TECHNOLOGY

Coal feeder is the main coal-feed equipment of pulverizing system of boiler in coal-fired power plants. In the case of coal feeder blockage, it can generally make the coal feeder equipment stop running to ensure the safe operation of coal feeder equipment.

At present, most coal feeder control systems in thermal power plants adopt electronic circuit boards to collect and amplify the weighing signals and speed-measuring signals, and the control system also adopts the instrumentation unique to the manufacturer. This way is highly integrated into the system, but not transparent, so that the user can not improve the system. It is difficult to find problems and maintain upon faults appears. What's worse, the extendability of the system is limited.

There are several problems by adopting the integrated circuit board mode:

1. The reliability of the control system is not enough: due to the control system is a black box circuit board, upon the reason of the fault can not be determined and maintained by the skilled of the power plant, the control system may only be replaced by the equipment provider.

2. After-sales response is slow. When the system fails, due to the limited maintenance capacity of the skilled of the power plant and slow response of the equipment provider, the production is affected.

3. Weighing system has the disadvantage of inaccurate weighing. The weighing calibration method for the original system can not be understood and modified.

SUMMARY OF THE PRESENT DISCLOSURE

The present disclosure provides a PLC coal machine control system to solve the problems proposed in background technology: at present, the control system of the coal feeder has such shortcomings as inconvenient maintenance, poor system reliability and unstable operation.

The technical solutions of the present disclosure are: the present disclosure discloses a PLC coal machine control system, including: a PLC control unit, a weighing unit one, a weighing unit two, a drive unit, a frequency converter, a belt motor and a velocity measuring unit;

the PLC control unit is electrically connected to the weighing unit one and weighing unit two, for making a real-time collection of weight values of the two units, and the instantaneous weight values are obtained according to the collected weight values;

the PLC control unit is electrically connected to the drive unit, frequency converter and velocity measuring unit, for making a real-time collection of output signals of the drive unit, velocities of the frequency converter and velocities detected by the velocity measuring unit; and the drive unit is electrically connected to the PLC control unit, and the PLC control system drives the drive unit to run the belt motor to adjust coal quantity on a belt.

Preferably, the PLC control unit is electrically connected to the weighing unit one and weighing unit two, for making a real-time collection of weight values of the two units, and the instantaneous weight values are obtained according to the collected weight values; and the specific steps are:

the PLC control unit collects the weighing signal C1 and C2 measured, correspondingly, by the weighing unit one and weighing unit two on the site, and the weighing weights G1 and G2 are obtained according to the weighing signals C1 and C2; and the monitored weighing signals C1 and C2 are determined; when the output values of the weighing signal C1 and weighing signal C2 are between the maximum Cmax and minimum Cmix output by the weighing signals, then the weighing signal C1 and weighing signal C2 are time-sensitive, and the output values are linearly converted to the instantaneous weight G according to a defined zero point and a sensor; when the output value of the weighing signal C1 and weighing signal C2 are greater than the maximum Cmax or less than the minimum Cmix of the weighing signal output value, then the weighing signal C1 and weighing signal C2 are not time-sensitive, and the G0 recorded at the last moment is taken as the instantaneous weight G.

Preferably, the instantaneous weight G=G1+G2 or G=G0.

Preferably, the PLC control unit is electrically connected to drive unit, frequency converter and velocity measuring unit, for making a real-time collection of output signals of the drive unit, velocities of the frequency converter and velocities detected by the velocity measuring unit, specifically:

according to the instantaneous weight G and the belt velocity V calculated by the velocity measuring unit, the instantaneous coal feed rate F is obtained, and F=G*V; at the same time, the accumulated coal amount W1 is calculated, W1=W0+G/S*N; wherein, W0 represents accumulated coal feed quantity; N represents the number of pulses in one cycle; and S represents the number of span pulses.

Preferably, further including: the velocity output signal of the drive unit is automatically adjusted according to the requested coal feed rate F0 of an upper stage received from an upper system and an actual coal feed rate value, and the speed adjustment output signal A0$n$ of the drive unit at this moment is calculated, A0$n$=A0$n$−1+Kp*(F0−F)/F; wherein, A0$n$−1 represents a velocity adjustment output signal of the drive unit at the previous moment; Kp represents a proportional parameter; and F0 represents a requested coal feed rate of the upper system; and F represents a current instantaneous coal feed rate.

Preferably, according to the derived velocity adjustment output signal A0$n$ of the drive unit at this moment to give an instruction to the drive unit, and the drive unit adjusts the speed of the belt motor according to the received instruction. Then a real-time belt speed is detected by the velocity measuring unit and taken as V1, at this time, the belt speed V=V1: when the velocity measuring unit has no output pulses, the theoretical speed V2 converted by a frequency converter is switched; and at this time, the belt speed V=V2.

Preferably, further including an alarm unit, the alarm module is electrically connected to the PLC control unit, the PLC issues an early warning signal upon receiving a fault type, and the alarm unit alarms or trips upon receiving the early warning signal.

Preferably, the fault type includes:

a weighing unit fault: the signal output of the weighing unit is monitored, when its output value is greater than the maximum value and less than the minimum value, the alarm unit will be triggered to alarm, at the same time, a volume mode is switched to by the control system, and the quality recorded 10 s ago is taken as volume quality;

a PLC control unit battery fault: the battery voltage of the PLC control unit is monitored, upon a low voltage appears, the alarm unit will be triggered to alarm;

a frequency converter fault: when the system detects that a frequency alarm or a fault signal is given, the alarm unit is triggered by the system to give an alarm signal and trip; however, when a fault reset request is issued 3 times within 10 s, the system does not trip if the fault no longer exists;

a coal feed rate request disconnection fault: the system delays 3 s to trigger the alarm unit for alarm, and the system operates on the basis of the set minimum coal volume;

a belt motor fault: when the system detects that the belt motor current is too high, the alarm unit is triggered to alarm, and the system alarms after 5 s; and a coal quantity fault: when the system detects that the difference between the actual coal feed rate and the request coal feed rate is greater than 0.25 t/h and 45$s$ continuously, the alarm unit is triggered to alarm.

Preferably, the weighing unit one and weighing unit two are weighing sensors;

the drive unit is a drive frequency converter; and the velocity measuring units are velocity measuring sensors.

Compared with the prior art, the technical effects of the present disclosure are:

according to the present disclosure, the PLC control unit is taken as a center, and the control unit is electrically connected to the weighing unit one, weighing unit two, drive unit, frequency converter, belt motor and velocity measuring unit; the PLC control unit is used to send signals to control the outputs of the weighing unit one, weighing unit two, drive unit, frequency converter, belt motor, etc, improving the control accuracy and allowing the coal feed rate of the equipment is higher than 0.25%. At the same time, the coal transported quantity on both sides of the transport belt is collected and the signal is processed through a PLC controller, improving the safety and stability of the system significantly. In addition, the previous fault records can be tracked under the control of the PLC controller; the source of the fault of the equipment is prone to be found and the fault may be removed timely, ensuring the normal safe production and stable operation of a generator set.

The technical solutions of the present disclosure are further described in detail below with reference to the attached drawings and examples.

DESCRIPTION OF ATTACHED DRAWINGS

FIG. 1 is an overall flow diagram of a PLC coal machine control system according to the present disclosure.

SPECIFIC EMBODIMENTS

The technical solutions of the present disclosure are further described in detail below with reference to the attached drawings and examples.

The technical solutions are described clearly and completely based on the attached drawings and specific embodiments. It should be understood that the following preferred examples are merely illustrative of the present disclosure and should not be deemed as limiting the scope of the present disclosure. Some non-substantial improvements and adjustments according to the following contents of the present disclosure can be made by those skilled in the art. In the present disclosure, unless otherwise clearly specified and limited, the technical terms of the application is the common meaning understood by those skilled of the present disclosure. The terms "connected", "be connected to", "fixed" and "provided with" should be understood in a broad sense. For example, the connection can be fixed connection, detachable connection, integral connection, direct connection, indirect connection through an intermediate medium, mechanical connection, or electrical connection. Unless otherwise clearly specified and limited, for those of ordinary skilled in the art, the specific meanings of the above terms in the present disclosure can be understood according to specific circumstances. Unless otherwise clearly specified and limited, the first feature is "above" or "below" the second feature may be the first feature is directly in contact with the second feature, or the first and second features are in contact through an intermediate medium. Moreover, the first feature is "on the top of" or "above" or "on" the second feature, may be the first feature is directly above or obliquely above the second feature, or only indicates that the horizontal height of the first feature is higher than that of the second feature. The first feature is "under" or "below" or "at the bottom of" the second feature, may be the first feature directly below or obliquely below the second feature, or simply indicates that the horizontal height of the first feature is lower than that of the second feature. Relational terms such as first, second, etc., are only used to distinguish one entity or operation from another entity or operation, and do not necessarily require or imply any such actual relationship or sequence between these entities or operations. It should be noted that: similar labels and letters indicate similar items in the attached drawings below, so that once an item is defined in one attached drawing, no further definition or explanation is required in subsequent attached drawings.

Example 1, referring to FIG. 1, a PLC coal machine control system is provided in an example of the present disclosure, further including: a PLC control unit, a weighing unit one, a weighing unit two, a drive unit, a frequency converter, a belt motor and a velocity measuring unit;

the PLC control unit is electrically connected to the weighing unit one and weighing unit two, for making a real-time collection of weight values of the two units, and an instantaneous weight is gained according to the collected weight values;

the PLC control unit is electrically connected to the drive unit, frequency converter and velocity measuring unit, for making a real-time collection of output signals of the drive unit, velocities of the frequency converter and velocities detected by the velocity measuring unit;

the drive unit is electrically connected to the PLC control unit, and the PLC control unit drives the drive unit to run the belt motor to adjust the coal quantity on a belt.

Preferably, the weighing unit one and weighing unit two are weighing sensors;

the drive unit is a drive frequency converter; and the velocity measuring units are velocity measuring sensors.

The beneficial effects of above technical solutions are: according to the present disclosure, the PLC control unit is taken as a center, and the control unit is electrically connected to the weighing unit one, weighing unit two, drive unit, frequency converter, belt motor and velocity measuring unit, PLC control unit is used to send signals to control outputs of the weighing unit one, weighing unit two, drive unit, frequency converter, belt motor and others, improving the control accuracy and allowing the coal feed rate of the equipment is higher than 0.25%. At the same time, the coal-transported quantity on both sides of a transport belt is collected and the signal is processed by a PLC controller, improving the safety and stability of the system significantly. In addition, the previous fault records can be tracked under the control of the PLC controller, the source of the fault of the equipment is prone to be found and the fault may be removed timely, ensuring the normal safe production and stable operation of a generator set.

The present disclosure solves the problems of: at present, the coal feeder control system has disadvantages of inconvenient maintenance, poor system reliability and unstable operation.

Example 2, on the basis of example 1, the PLC control unit is electrically connected to the weighing unit one and weighing unit two, for making a real-time collection of weight values of the two units, and an instantaneous weight is gained according to the collected weight values, and the specific steps are:

the PLC control unit collects the weighing signal C1 and C2 measured, correspondingly, by the weighing unit one and weighing unit two on the site, and the weighing weights G1 and G2 are obtained according to the weighing signals C1 and C2;

the monitored weighing signals C1 and C2 are determined; when the output values of the weighing signal C1 and weighing signal C2 are between the maximum Cmax and minimum Cmix output by the weighing signals, then the weighing signal C1 and weighing signal C2 are time-sensitive, and the output values are linearly converted to the instantaneous weight G according to a defined zero point and a sensor. When the output value of the weighing signal C1 and weighing signal C2 are greater than the maximum Cmax or less than the minimum Cmix output by the weighing signals, then the weighing signal C1 and weighing signal C2 are not time-sensitive, and the G0 recorded at the last moment (10 s) is taken as the instantaneous weight G.

Preferably, the instantaneous weight G=G1+G2 or G=G0.

Preferably, the PLC control unit is electrically connected to the drive unit, frequency converter and velocity measuring unit, for making a real-time collection of output frequencies of the drive unit and velocities detected by the velocity measuring unit, specifically:

according to the instantaneous weight G and the belt velocity V calculated by the velocity measuring unit, the instantaneous coal feed rate F is obtained, and $F=G*V$;

the accumulated coal quantity W1 is calculated, $W1=W0+G/S*N$; wherein, W0 represents accumulated coal feed quantity; N represents the number of pulses in one cycle; and S represents the number of span pulses.

Preferably, further including: the velocity output signal of the drive unit is automatically adjusted according to the requested coal feed rate F0 of an upper stage received from an upper system and an actual coal feed rate value, and the speed adjustment output signal A0$n$ of the drive unit at this moment is calculated, $A0n=A0n-1+Kp*(F0-F)/F$; wherein, A0$n$-1 represents a velocity adjustment output signal of the drive unit at the previous moment; Kp represents a proportional parameter; and F0 represents a requested coal feed rate of the upper system; and F represents a current instantaneous coal feed rate.

Preferably, according to the derived velocity adjustment output signal A0$n$ of the drive unit at this moment to give an instruction to the drive unit, and the drive unit adjusts the speed of the belt motor according to the received instruction. Then the real-time belt speed is detected by the velocity measuring unit and taken as V1, at this time, the belt speed V=V1: when the velocity measuring unit has no output pulses, the theoretical speed V2 converted by the frequency converter is switched; and at this time, the belt speed V=V2.

The beneficial effects of the above technical solution are:

According to the present disclosure, when the system is operated, the PLC control unit collects the weight values of the two weighing sensors on the site and determines whether they are time-sensitive. If they are, they are linearly converted to the instantaneous weights according to the defined zero point and sensor. If not, the weight recorded at the last moment (data recorded 10 s ago) is taken as the instantaneous weights.

The PLC control unit collects the output frequencies of the velocity measuring sensor and frequency converter, the instantaneous coal feed quantity F can be calculated according to the instantaneous weights and velocity measuring sensor (the V1 measured by the velocity measuring sensor is used preferably, when the velocity measuring sensor has no output pulses, the theoretical velocity V2 calculated by the frequency of the frequency converter is used), and the cumulative coal feed quantity W is calculated. According to the DCS coal feed request F0 and the calculated instantaneous coal feed quantity F at present, the automatic adjustment and control is carried out. A closed-loop control mode is used to control the frequency converter of the belt motor, realizing coal feed quantity adjustment, so that the stable operation of the system is guaranteed.

Example 3, on the basis of example 2, further including an alarm unit, the alarm module is electrically connected to the PLC control unit, the PLC issues an early warning signal upon receiving a fault type, and the alarm unit issues an alarm or trips upon receiving the early warning signal.

Preferably, the fault type includes:

a weighing unit fault: the signal output of the weighing unit is monitored, when its output value is greater than the maximum value and less than the minimum value, the alarm unit will be triggered to alarm, at the same time, a volume mode is switched to by the control system, and the quality recorded 10 s ago is taken as the volume quality;

a PLC control unit battery fault: the battery voltage of the PLC control unit is monitored, upon a low voltage appears, the alarm unit will be triggered to alarm;

a frequency converter fault: when the system detects that a frequency alarm or a fault signal is given, the alarm unit is triggered by the system to give an alarm signal and trips; however, when a fault reset request is issued 3 times within 10 s, the system does not trip if the fault no longer exists;

a coal feed rate request disconnection fault: the system delays 3 s to trigger the alarm unit for alarm, and the system operates on the basis of the set minimum coal quantity;

a belt motor fault: when the system detects that the belt motor current is too high, the alarm unit is triggered to alarm, and the system alarms after 5 s; and a coal quantity fault: when the system detects that the difference between an actual coal feed rate and a request coal feed rate is greater than 0.25 t/h and 45s continuously, the alarm unit is triggered to alarm.

The beneficial effects of the above technical solutions are: the arrangement of the alarm module in the present disclosure has the beneficial effects of: the reliability of coal quantity control of the coal machine is ensured, and the accuracy of state monitoring during the operation of the coal machine is improved, reducing the accident rate of the equipment and realizing that the fault may be found by evidence and eliminated quickly and conveniently. Therefore, the coal feeder trip phenomenon and maintenance times caused by the instability of the system is reduced effectively.

In addition, the programmable controller (PLC), having a standard data interface and strong universality, of the present disclosure is widely used in the industrial control field. The user can change and optimize the control program according to the needs of the process. The human-machine interface is friendly in simple operation and high efficiency. A PLC based on a high-performance central processor has a quick response to system adjustment and a superior regulation performance, favoring by the industrial control industry.

The present disclosure mainly focuses on the domestic design and application of the PLC of coal feeder control system of the coal-fired power plant, the function of the device is to control the coal feed rate of the belt coal feeder according to the operation instruction. The popular ladder diagram design language is adopted to facilitate the design, development and debugging. In hardware, the programmable controller (PLC) with higher reliability and stability is adopted. At the same, a variety of methods to enhance reliability and stability are adopted in software design. All of above enhances the anti-interference capability and is fully applicable to industrial sites. In human-interface of the human-machine, a Chinese touchable screen with 10 inches is adopted and the system process is enhanced, allowing the system to be operated easier, which brings great convenience to operators and reduces the difficulty in maintenance for maintenance personnel. At the same time, all the electrical secondary circuits adopt national standard components with strong generality, which is conducive to reducing spare parts inventory. The PLC is equipped with an international standard IO module, with flexible access to measurement points and simple software operation may change the type of measurement points and range, etc., which can fully utilize the existing measurement points of the coal feeder on the former site without any transformation of the coal feeder body equipment. The installation period is short for a complete control device, without unit shutdown, and avoids unnecessary increase of investment. A plurality of standard signal output channels are provided to add new output parameters for the operator to monitor according to the operation requirements.

Obviously, those skilled in the art can make various changes and modifications to the present disclosure without departing from the spirit and scope of the present disclosure. In this way, if those modifications and changes fall within the scope of the claim of the present disclosure and equivalent technology thereof, the present disclosure is also intended to include these modifications and changes.

What is claimed is:

1. A PLC coal machine control system, characterized in comprising: PLC control unit, weighing unit one, weighing unit two, drive unit, frequency converter, belt motor and velocity measurement unit;

the PLC control unit is electrically connected with weighing unit one and weighing unit two, and is used to make real-time collection of the weight value of the two units, and the instantaneous weight is gained whereby;

the PLC control unit is electrically connected with drive unit, frequency converter and velocity measurement unit, and is used to make real-time collection of the output signal of drive unit, velocity of frequency converter and the velocity detected by velocity measurement unit;

the drive unit is electrically connected with the PLC control unit, which drives the drive unit to run the belt motor and the coal volume of the belt is adjusted thereby;

wherein the PLC coal machine control system further comprises an alarm unit, the alarm unit is electrically connected with PLC control unit, and the PLC control unit sends a precaution signal after receiving fault type, and the alarm unit sends an alarm or acts on tripping after receiving the precaution alarm;

wherein the fault type comprises;

weighing unit fault: monitoring the signal output of the weighing unit, when the output value is greater than the maximum value and less than the minimum value, the alarm unit will be triggered to send an alarm, at the same time, the control system is changed to volume mode and takes the volume quality of ten seconds ago;

PLC control unit battery fault: monitoring the battery voltage of the PLC control unit, when a low voltage appears, the alarm unit will be triggered to send an alarm;

frequency converter fault: when the system detects the frequency alarm or the fault signal is sent, the alarm unit is triggered to send an alarm and trip; While if 3 times of fault reset requested within 10 seconds and if the fault is solved, the system doesn't trip;

the coal feed rate request disconnection fault: the system delays 3 seconds to trigger the alarm unit for alarm, and the system is based on the set minimum coal amount operation;

the belt motor fault: when the system detects the electric current of the belt motor is too high, the alarm unit is triggered to send an alarm and the system sends an alarm after 5 seconds;

the coal amount fault: when the system detects the difference between the actual coal feed rate and the request coal feed rate is greater than 0.25 t/h, and the alarm unit is triggered to send an alarm after 45 seconds.

2. A PLC coal machine control system according to claim 1, wherein the PLC control unit is electrically connected with weighing unit one and weighing unit two, and is used to make real-time collection of the weight value of the two units, and the instantaneous weight is gained whereby;

the PLC control unit collects the weighing signal C1 and C2 respectively measured by weighing unit one and weighing unit two on the site, and the weighing weight G1 and G2 are obtained according to the weighing signal C1 and C2;

judging the weighing signal C1 and C2 that monitored, when the output value of the weighing signal C1 and weighing signal C2 are between the maximum Cmax and minimum Cmix of the weighing signal output value, the weighing signal C1 and weighing signal C2 are time-efficient, and they are linearly converted to instantaneous weight G according to defined zero point and sensor; When the output value of the weighing signal C1 and weighing signal C2 are more than the maximum Cmax or less than minimum Cmix of the weighing signal output value, the weighing signal C1 and weighing signal C2 are no time-efficient, taking G0 recorded at the last moment as the instantaneous weight G.

3. A PLC coal machine control system according to claim 2, characterized in that:
the instantaneous weight G=G1+G2 or G=G0.

4. A PLC coal machine control system according to claim 3, characterized in that: the PLC control unit is electrically connected with drive unit and velocity measurement unit, and is used to make real-time collection of the output frequency and the velocity detected by velocity measurement unit, specifically:
according to the belt velocity V calculated by the instantaneous weight G and velocity measurement unit, the instantaneous coal feed amount rate F is obtained, and F=G*V;
the accumulated coal amount $W_1$ is calculated, $W_1=W_0+G/S*N$; wherein, $W_0$ represents accumulated coal feed amount; N represents pulse number in one period, S represents span pulse number.

5. A PLC coal machine control system according to claim 4, characterized in comprising: the speed output signal of the drive unit is automatically adjusted according to the coal feed rate $F_0$ and the actual coal feed rate requested by the superior system received by the superior, and the speed adjustment output signal $A_{On}$ in this time is calculated, $A_{On}=A_{On-1}+Kp*(F_0-F)/F$, wherein, $A_{On-1}$ represents the speed adjustment output signal of the drive unit at the previous time, Kp represents parameter of proportion, $F_0$ represents the coal feed rate requested by the superior system, F represents the present instantaneous coal feed rate.

6. A PLC coal machine control system according to claim 5, characterized in that: according to the speed adjustment output signal $A_{On}$ of the drive unit at present time to give instruction to drive unit, and the drive unit adjusts the speed of the belt motor according to the instruction; The real-time speed of the belt monitored by velocity measurement unit is V1, the belt speed V=V1 at that time: when velocity measurement unit has no output pulse, the theoretical speed V2 of frequency conversion of the converter is used, the belt speed V=V2 at that time.

7. A PLC coal machine control system according to claim 1, characterized in that:
the weighing unit one and the weighing unit two are weighing sensors;
the drive unit is drive frequency converter;
the velocity measurement unit is velocity measurement sensor.

* * * * *